(12) United States Patent
Oseto et al.

(10) Patent No.: US 8,760,729 B2
(45) Date of Patent: Jun. 24, 2014

(54) INFORMATION PROCESSING APPARATUS, INFORMATION MANAGEMENT METHOD, AND INFORMATION MANAGEMENT PROGRAM

(75) Inventors: Futoshi Oseto, Kanagawa (JP); Naritake Kondoh, Kanagawa (JP)

(73) Assignee: Ricoh Company, Ltd., Toyko (JP)

( * ) Notice: Subject to any disclaimer, the term of this patent is extended or adjusted under 35 U.S.C. 154(b) by 30 days.

(21) Appl. No.: 13/472,008

(22) Filed: May 15, 2012

(65) Prior Publication Data

US 2012/0300268 A1    Nov. 29, 2012

(30) Foreign Application Priority Data

May 27, 2011    (JP) .................. 2011-119341

(51) Int. Cl.
*H04N 1/04* (2006.01)
*G06F 3/12* (2006.01)
*G06K 15/00* (2006.01)

(52) U.S. Cl.
USPC ......... 358/474; 358/1.13; 358/1.14; 358/1.15

(58) Field of Classification Search
USPC ............... 358/474, 1.13, 1.14, 1.15
See application file for complete search history.

(56) References Cited

U.S. PATENT DOCUMENTS

2007/0076244 A1    4/2007    Suzuki et al.
2007/0106905 A1    5/2007    Ito
2012/0105901 A1*   5/2012    Miyazaki et al. ............ 358/1.14

FOREIGN PATENT DOCUMENTS

JP    2006-114020 A    4/2006
JP    2007-128323 A    5/2007

* cited by examiner

*Primary Examiner* — Charlotte M Baker
*Assistant Examiner* — Rury Grisham
(74) *Attorney, Agent, or Firm* — Harness, Dickey & Pierce

(57) ABSTRACT

An information processing apparatus, including a reading apparatus which reads an electronic recording card, is disclosed. The apparatus includes a reading unit which reads the electronic recording card via the reading apparatus and obtains read information; a generating unit which generates user management information of a user who owns the electronic recording card based on the read information obtained by the reading unit; and a holding unit which holds the user management information generated by the generating unit in a predetermined storage area.

10 Claims, 18 Drawing Sheets

FIG.4

| USER IDENTIFICATION | MANAGEMENT |
|---|---|
| C001 | (E-MAIL ADDRESS VALUE), (ACCESS CONTROL VALUE), ...... |
| C002 | (E-MAIL ADDRESS VALUE), (ACCESS CONTROL VALUE), ...... |
| ...... | ...... |

20D

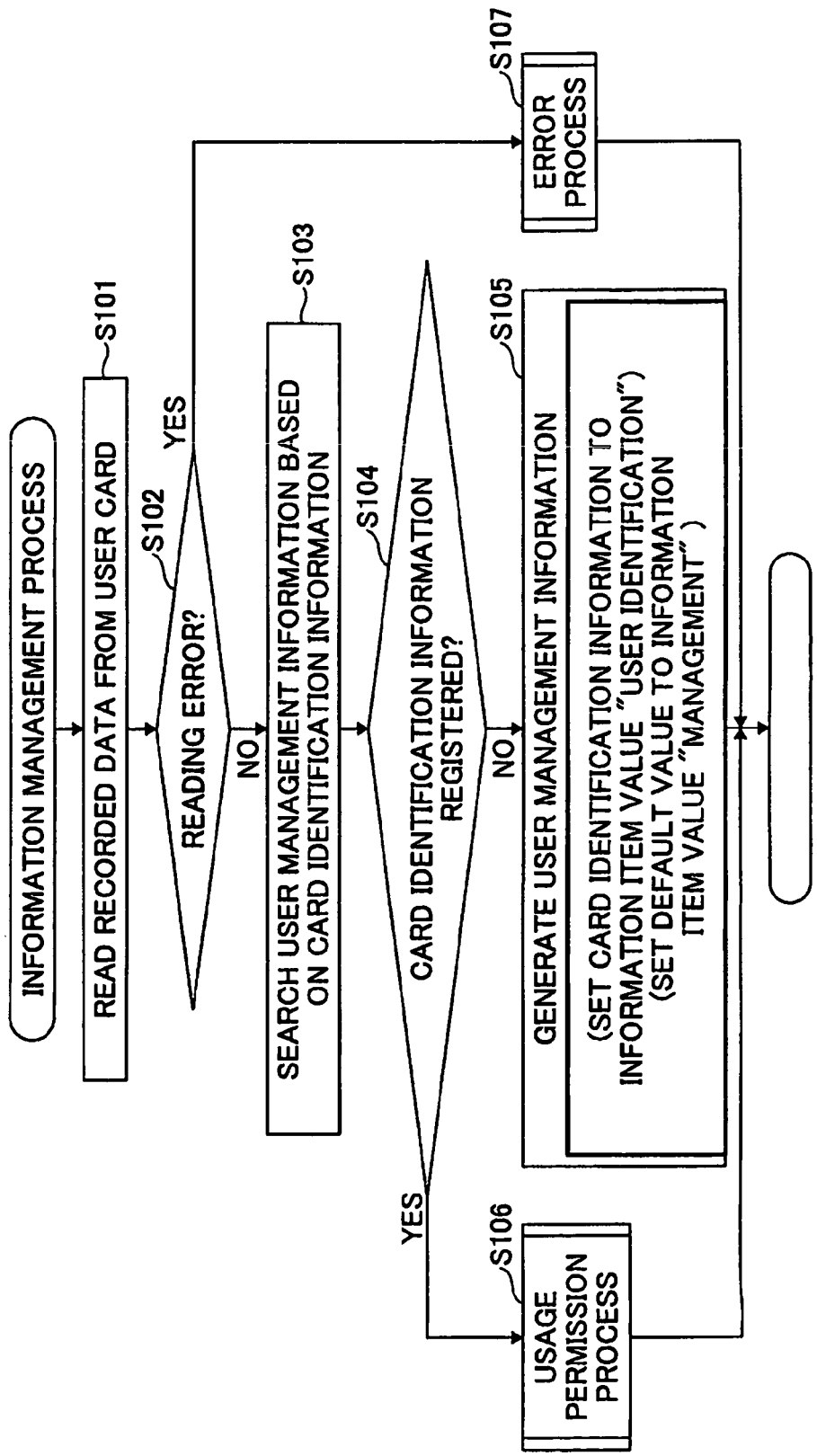

| USER IDENTIFICATION | MANAGEMENT |
|---|---|
| — | — |
| — | — |
| — | — |

| USER IDENTIFICATION | MANAGEMENT |
|---|---|
| C001 | (default VALUE), (default VALUE), ····· |
| — | — |
| — | — |

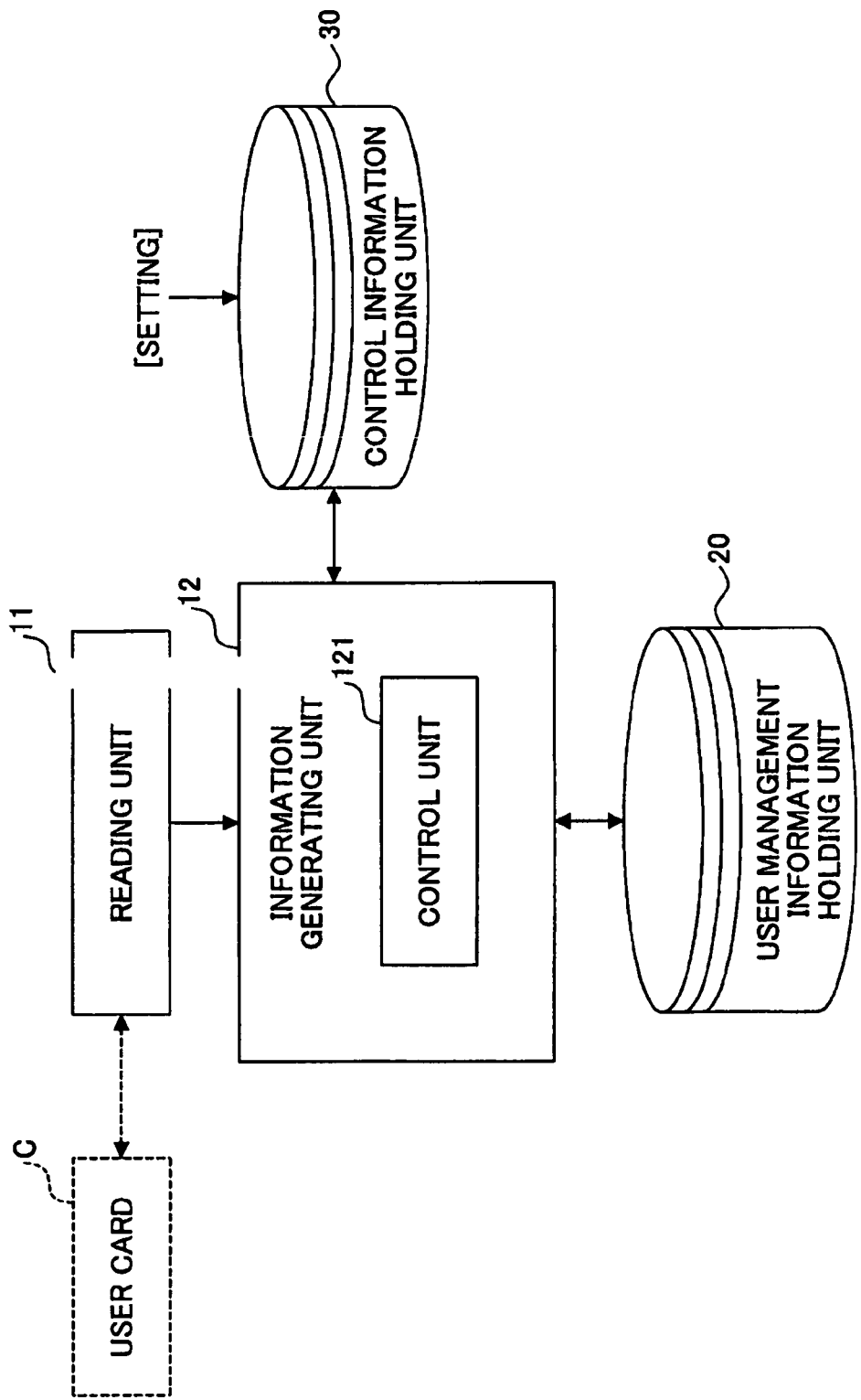

| GENERATING | CONTROL SETTING | | |
| --- | --- | --- | --- |
| | GENERATING RULE | | TARGET DATA |
| USER IDENTIFICATION | "User" | HEAD | ADDRESS a |
| E-MAIL ADDRESS | "@XXX.com" | TAIL | ADDRESS b |
| ..... | ..... | ..... | ..... |

| GENERATING | CONTROL SETTING | |
| --- | --- | --- |
| | GENERATING RULE | TARGET DATA |
| USER IDENTIFICATION | "User%" | ADDRESS a |
| E-MAIL ADDRESS | "%@XXX.com" | ADDRESS b |
| ..... | ..... | ..... |

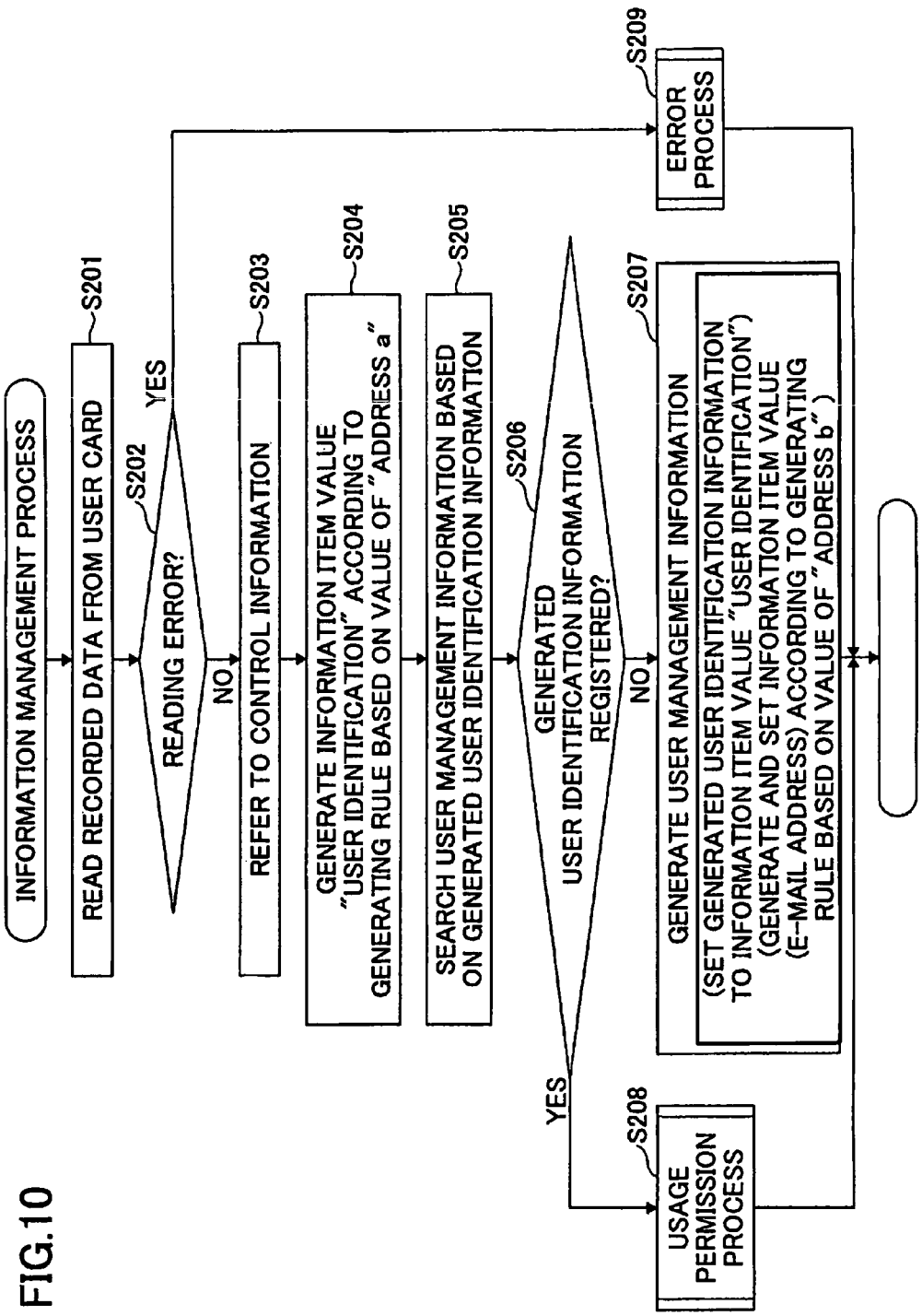

| USER IDENTIFICATION | MANAGEMENT |
|---|---|
| — | — |
| — | — |
| — | — |

| USER IDENTIFICATION | MANAGEMENT |
|---|---|
| User001 | (abc@XXX.com), ····· |
| — | — |
| — | — |

FIG.13

| GENERATING | CONTROL SETTING ||
| | GENERATING RULE (REGULAR EXPRESSION) | TARGET DATA |
| USER IDENTIFICATION | "0[w*]? U%:P%" | ADDRESS a |
| E-MAIL ADDRESS | "[¥w¥d._-]? %@XXX.com:none" | ADDRESS b |
| ...... | ...... | ...... |

| USER TYPE | RESTRICTION SETTING | | |
|---|---|---|---|
| | FUNCTION A | FUNCTION B | FUNCTION C |
| REGULAR | NON-PERMISSION | PERMISSION | PERMISSION |
| NON-REGULAR | PERMISSION | NON-PERMISSION | NON-PERMISSION |
| ..... | ..... | ..... | ..... |

| USER IDENTIFICATION | MANAGEMENT |
|---|---|
| — | — |
| — | — |
| — | — |

| USER IDENTIFICATION | MANAGEMENT |
|---|---|
| U001 | (abc@XXX.com), (FUNCTION A,B,C)··· |
| — | — |
| — | — |

| USER IDENTIFICATION | MANAGEMENT |
|---|---|
| U001 | (abc@XXX.com), (FUNCTION A,B,C)··· |
| P1101 | (none), (FUNCTION A)··· |
| — | — |

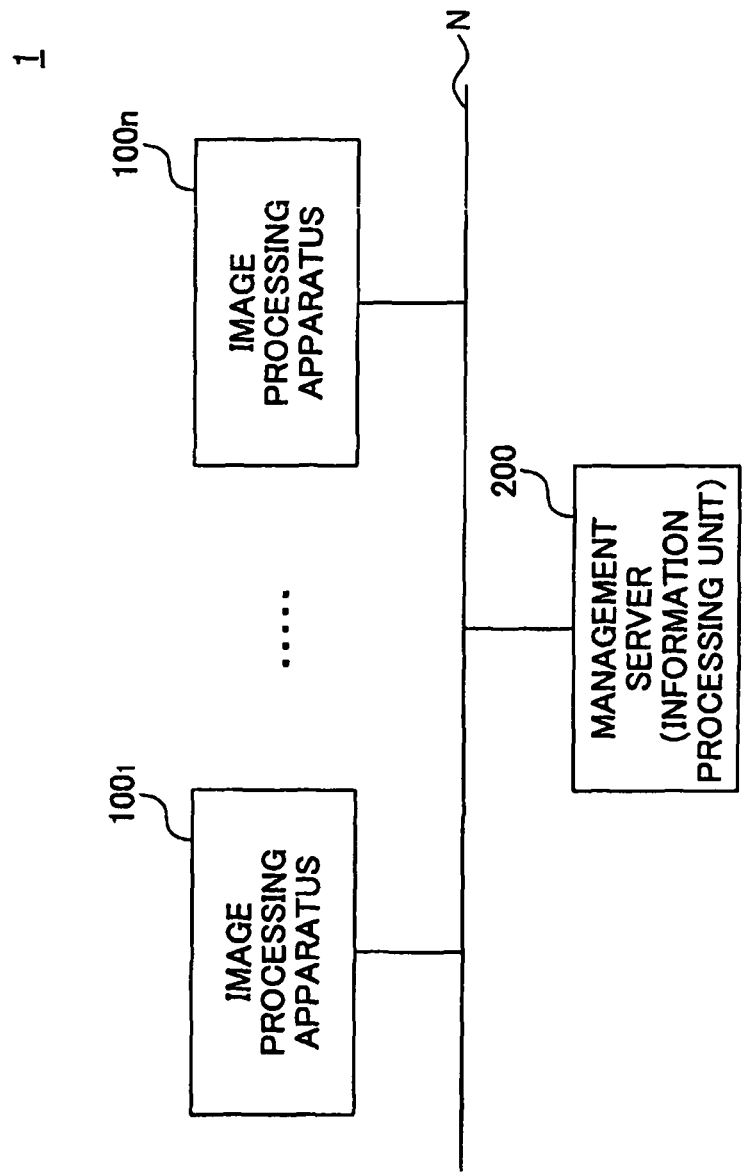

INFORMATION PROCESSING APPARATUS, INFORMATION MANAGEMENT METHOD, AND INFORMATION MANAGEMENT PROGRAM

TECHNICAL FIELD

The present invention relates to techniques for controlling information management of a user in using equipment units.

BACKGROUND ART

In recent years, electronic recording cards such as an IC card (integrated circuit card), etc., have become popular with their superior portability and ample information capacity in the background.

In light of the above, a scheme is being introduced which manages users using the electronic recording card with an object of operating equipment units such as establishing information confidentiality and restricting usage even in an environment in which electronic equipment units such as an image processing apparatus, etc., are used. In the environment in which such a scheme is introduced, a user may utilize an electronic equipment unit by the following method, for example. First, the user places an electronic recording card (below called "a user card" for convenience) which is issued in advance to the user over a reading apparatus included in an electronic equipment unit which the user seeks to use. Here, the electronic equipment unit matches management information of a user already registered with information read from a user card and determines usage permission from the matched results. As a result, the user may use electronic equipment unit when he is allowed to use it.

However, in such a scheme, it is necessary to collate information read from the user card with management information of the user. Currently, such collating operation (below called "information management task") is being done manually by an administrator, which operation is cumbersome for the administrator. Therefore, a technique is being proposed which makes it possible for the user himself to collate the above-described information sets.

For example, Patent document 1 discloses a technique of prompting a user to input user information ("log-in information, for example) at the time of initial reading of a user card and, upon the information being input, collating information read from the user card and management information of the user specified based on the input information to reduce a burden on information management tasks.

PATENT DOCUMENT

Patent Document 1 JP2007-128323A

However, with the related-art information management, a user must input information manually, so that the task is cumbersome for the user.

In light of the above, it is desirable that management information and information read from the user card are dynamically collated without the administrator or the user carrying out cumbersome tasks.

DISCLOSURE OF THE INVENTION

In light of problems of the related art as described above, an object of the present invention is to provide an information processing apparatus, an information management method, and an information management program which make it possible to dynamically collate management information of a user and reading information of a user card.

According to an embodiment of the present invention, an information processing apparatus, including a reading apparatus which reads an electronic recording card, is provided, the information processing apparatus including a reading unit which reads the electronic recording card via the reading apparatus and obtains read information; a generating unit which generates user management information of a user who owns the electronic recording card based on the read information obtained by the reading unit; and a holding unit which holds user management information generated by the generating unit in a predetermined storage area.

According to another embodiment of the present invention, an information management method in an information processing apparatus, including a reading apparatus which reads an electronic recording card, is provided, the method including the steps of reading the electronic recording card via the reading apparatus and obtaining read information; generating user management information of a user who owns the electronic recording card based on the read information obtained by the reading step; and holding, in a predetermined storage area, user management information generated by the generating step.

According to a further embodiment of the present invention, a computer-readable recording medium having recorded thereon an information management program in an information processing apparatus including a reading apparatus which reads an electronic recording card is provided, wherein the information management program causes the computer to function as a reading unit which reads the electronic recording card via the reading apparatus and obtains read information; a generating unit which generates user management information of a user who owns the electronic recording card based on the read information obtained by the reading unit; and a holding unit which holds user management information generated by the generating unit as a holding unit which holds it in a predetermined storage area.

The present invention makes it possible to provide an information processing apparatus, an information management method, and an information management program which dynamically collate management information of a user and reading information of a user card.

BRIEF DESCRIPTION OF THE DRAWINGS

Other objects, features, and advantages of the present invention will become more apparent from the following detailed descriptions when read in conjunction with the accompanying drawings, in which:

FIG. 4 is a diagram illustrating exemplary data of user management information according to the first embodiment of the present invention;

FIG. 5 is a flowchart illustrating an exemplary processing procedure of information management according to the first embodiment of the present invention;

FIGS. 6A and 6B are diagrams illustrating an exemplary data transition of user management information according to the first embodiment of the present invention;

FIG. 7 is a diagram illustrating an exemplary functional configuration of information management according to a second embodiment of the present invention;

FIGS. 8A and 8B are diagrams illustrating exemplary data of control information according to the second embodiment of the present invention;

FIG. 10 is a flowchart illustrating an exemplary processing procedure of information management according to the second embodiment of the present invention;

FIGS. 11A and 11B are diagrams illustrating the exemplary data transition of user management information according to the second embodiment of the present invention;

FIG. 13 is a diagram illustrating exemplary data of control information according to the third embodiment of the present invention;

FIG. 14 is a diagram illustrating exemplary data of restriction information according to the third embodiment of the present invention;

FIGS. 16A, 16B, and 16C are diagrams illustrating the exemplary data transition of user management information according to the third embodiment of the present invention;

FIG. 17 is a diagram illustrating an exemplary system configuration of a user management system according to a variation of embodiments of the present invention.

BEST MODE FOR CARRYING OUT THE INVENTION

Below, preferred embodiments (below called "embodiments") of the present invention are described in detail using the drawings.

A First Embodiment

Hardware Configuration

Figure 1:
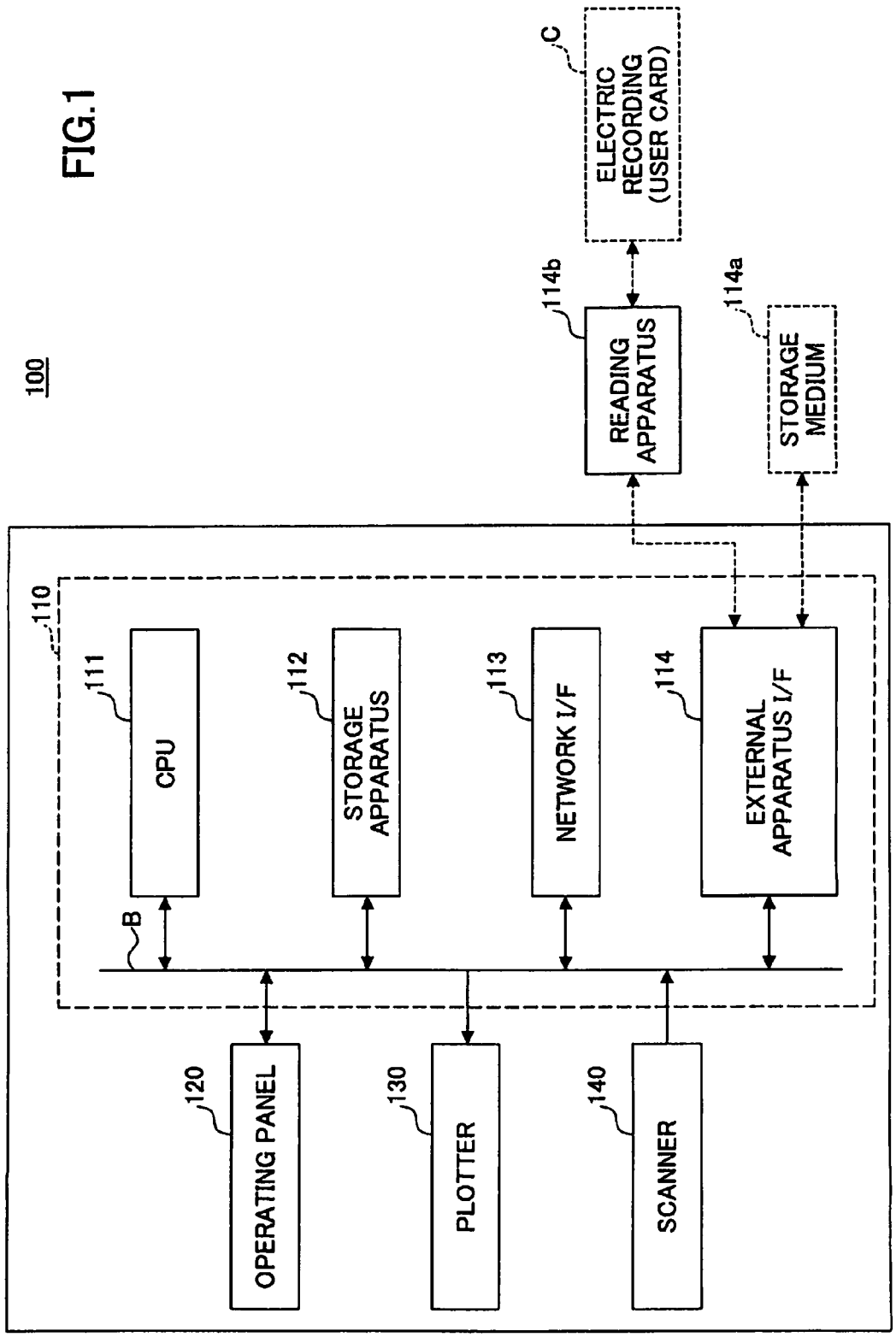
FIG. 1 is a diagram illustrating an exemplary hardware configuration of an image processing apparatus according to the first embodiment of the present invention.

FIG. 1 is a diagram showing an exemplary hardware configuration of an image processing apparatus according to the present embodiment. FIG. 1 shows an example when the image processing apparatus 100 is an MFP (multifunctional peripheral).

As shown in FIG. 1, the image processing apparatus 100 includes a controller 110, an operating panel 120, a plotter 130, a scanner 140, etc., which are mutually connected by a bus B.

The operating panel 120, which includes a display unit and an input unit, provides various information sets such as an equipment information set, etc., to a user and accepts various user operations such as an operation setting, an operation instruction, etc. The plotter 130, which includes an image forming unit, forms an output image on a sheet. As methods of forming the output image, there are an electro photographic process and an inkjet method, for example. The scanner 140 optically reads a manuscript and generates an image read.

The controller 110 includes a CPU (Central processing unit) 111, a storage apparatus 112, a network I/F 113, an external apparatus I/F 114, etc., which are mutually connected to the bus B.

The CPU 111 executes programs to control the whole apparatus. Moreover, the storage apparatus 112 stores and holds the above-described programs and various data sets ("image data", for example). The storage apparatus 212 includes, for example, a RAM (random access memory), which is a volatile memory; a ROM (read only memory), which is a non-volatile memory; and an HDD (hard disk drive), which includes a large-capacity storage area. The RAM functions as a work area (a storage area to which data and programs are temporarily read) of the CPU 111. The ROM and the HDD are used as storage locations for various data sets and programs. In this way, in the image processing apparatus 100, the CPU 111 reads the program stored in the ROM onto the RAM (memory) and executes the programs.

The network I/F 113 is an interface for connecting the image processing apparatus 100 to a predetermined data transmission path such as a network, etc. In this way, the image processing apparatus 100 may conduct data communications with other equipment units (not shown) via the network I/F 113.

The external apparatus I/F 114 is an interface for connecting to an external apparatus. For example, the external apparatus includes a recording medium 114a, which includes an SD memory card, a USB (universal serial bus) memory, etc., for example. In this way, the image processing apparatus 100 may read from and/or write to the recording medium 114a via the external apparatus I/F 114.

Moreover, the external apparatus, for example, includes a reading apparatus 114b, which reads an electronic recording card C, etc., which electronic recording card C includes a contact-type/non-contact type IC card, etc., for example. In this way, the image processing apparatus 100 may read the electronic recording card C via a reading apparatus 114b connected to the external apparatus I/F 114.

As described above, the image processing apparatus 100 according to the present embodiment may provide an image processing function (an image processing service) with the above-described hardware configuration.

Information Management Function

An information management function according to the present embodiment is described.

In the image processing apparatus 100 according to the present embodiment, when a user card C is first read, user management information is generated according to a predetermined rule based on the read information and registered to a predetermined storage area to dynamically collate management information of the user and read information of the user card C. As a result, when the same user card C is read the next time in the image processing apparatus 100, usage permission is determined based on management information of the user that is collated to register (that is tied to the user card). The image processing apparatus 100 according to the present embodiment has such an information management function.

Conventionally, in the information management in equipment utilizing environment using the user card C, an administrator or user must manually perform a task of collating the management information of the user and the read information of the user card C.

Then, in the image processing apparatus 100 according to the present embodiment, a scheme is arranged such that the management information of the user is generated based on information read at an initial reading of the user card C.

In this way, the image processing apparatus 100 according to the present embodiment provides an environment in which the management information of the user and the read information of the user card C are dynamically collated. As a result, in the image processing apparatus 100 according to the present embodiment, an operational burden of the administrator/user in information management may be reduced. (It is not necessary to manually collate information).

Below, a configuration of the information management function and an operation thereof according to the present embodiment is described.

Figure 2:
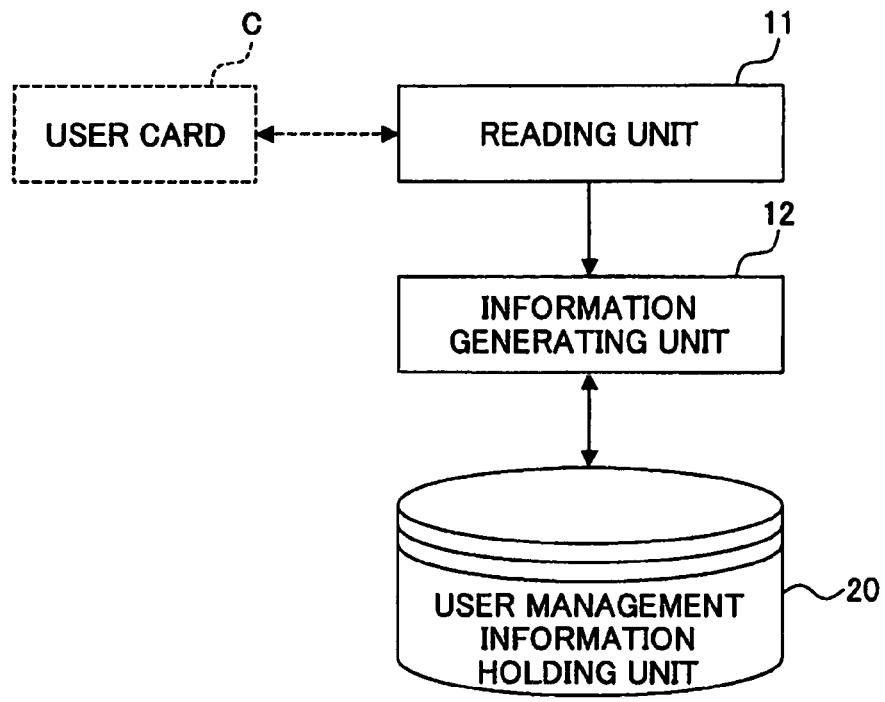
FIG. 2 is a diagram illustrating an exemplary functional configuration of information management according to the first embodiment of the present invention.

FIG. 2 is a diagram showing an exemplary functional configuration of information management according to the present embodiment.

As shown in FIG. 2, an information management function according to the present embodiment includes a reading unit 11, an information generating unit 12, etc.

The reading unit 11 is a functional unit which reads recorded data of a user card C. The reading unit 11 controls an external apparatus I/F 114 and reads the recorded data from the user card C.

Here, a data configuration within the user card C is described.

Figure 3:
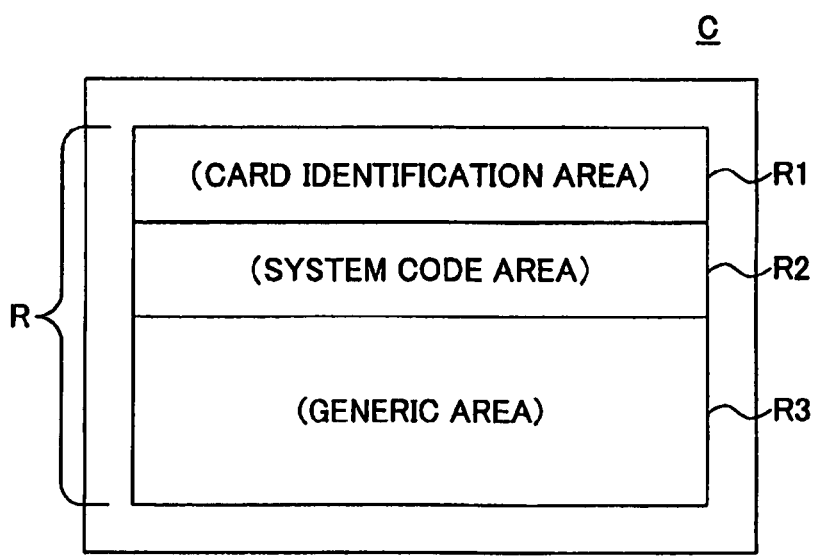
FIG. 3 is a diagram illustrating an exemplary data configuration of a user card according to the first embodiment of the present invention.

FIG. 3 is a diagram showing an exemplary data configuration of the user card C according to the present embodiment.

As shown in FIG. 3, the user card C includes recorded data areas R such as a card identification area R1, a system code area R2, a generic area R3, etc. Below, a description is given for case in which the user card C is Felica (trademark or registered trademark).

The card identification area R1 is a data area in which information identifying the user card C (below called "card identification information") is recorded and the recorded data include, an IDm data set (bit sequence) with a 128-bit length that is allocated globally unique at the time of issuing a card, for example. The system code area R2 is a data area in which is recorded information (system code information) for identifying an objective of issuing a user card C (for identifying a system), and the recorded data include data recorded by a card vendor (the card issuer) encoding a code determined according an objective of use applied. The generic area R3 includes a data area in which is recorded generic information (below called "generic information"), and the recorded data include data set by a user or an administrator (the card user), for example.

The reading unit 11 reads recorded data of the respective data areas R based on a predetermined address showing a location of accessing the data area R from the user card C placed over the reading apparatus 114b via the reading apparatus 114b connected to the external apparatus I/F 114.

Returning to the explanation of FIG. 2, the information generating unit 12 is a functional unit which, based on the information (recorded data of the user card C) read by the reading unit 11, generates information for managing the user (below called "user management information"), and registers it in the user management information holding unit 20. For example, the user management information holding unit 20 corresponds to a predetermined storage area of a storage apparatus 112 an image processing apparatus 100 is provided with.

Now, user management information is described.

FIG. 4 is a diagram indicating exemplary data of user management information 20D according to the present embodiment.

As shown in FIG. 4, the user management information 20D has information items such as "user identification" and "management" collated for each user. With such information, users are managed.

The "user identification" item is an item in which information identifying a user (below called "user identification information") is set, so that the item value includes an ID value assigned uniquely to the user. The "management" item is an item in which management information of equipment usage for the user (below called merely "management information"), so that the item value includes, for example, an e-mail address value which indicates a contact destination of the user; an access restriction value (a value indicating permission/non-permission of usage), etc., which shows usage restriction to the user of equipment installed functions.

Based on the read information, the information generating unit 12 sets the respective item values when the user card C is first read (or at the time of initial reading of the user card) to generate user management information 20D corresponding to the user and registers it in the user management holding unit 20.

Returning to the explanation of FIG. 2, in the present embodiment, the information generating unit 12 generates user management information 20D as follows: First, the information generating unit 12 sets, as a value of the "user identification" item recorded data of the card identification area R1 included in the information read by the user card C. Next, the information generating unit 12 sets as a value of "management" item a default value provided in advance.

In the present embodiment, it is determined, as a rule of generating user management information 20D, that the card identification information is used as user identification information or that a default value is used as management information in order to realize the above-described information generating operation. In other words, based on the predetermined generating rule, the information generating unit 12 generates user management information 20D.

In this way, in the present embodiment, the user management information 20D which is collated with reading information of the user card C is generated. In other words, with the information generating operation, the read information of the user card C and the user management information 20D are dynamically collated.

As described above, at the time of initial reading of the user card C, the information generating unit 12 generates and registers the user management information 20D. Then, based on user identification information of the user management information 20D, the information generating unit 12 determines whether the placed over user card C is an already read user card C. More specifically, based on the card identification information of the user card C, "user identification" item of the user management information 20D is searched and a determination is made from the searched results. As a result, when the card identifying information is not registered as user information, it is determined as a user card C which has never been read and carries out the information generating operation. On the other hand, when it is registered as user information, it is determined as a user card C which has been read and carries out the usage permitting operation.

As described above, the information management function according to the present embodiment is realized by the respective functional units operating in association. The above-described respective functional units are realized by programs (software which implements an information management function) installed in the image processing apparatus 100 that is read into a memory ("RAM") from a storage apparatus ("HDD", "ROM", etc.) by an operating apparatus (CPU) with the following process being executed.

Detailed operations of an information management function (operations of functional unit groups in association) according to the present embodiment are explained using a flowchart which indicates a processing procedure.

Process of Information Management

FIG. 5 is a flowchart illustrating exemplary processing procedures for information management according to the present embodiment.

As shown in FIG. 5, in the image processing apparatus 100, the reading unit 11 reads recorded data from the user card C (step S101). Then, the reading unit 11 detects an error having occurred at the time of reading (a reading error).

If the reading error is not detected (step S102: NO), the reading unit 11 passes read information (recorded data) to the information generating unit 12.

In the image processing apparatus 100, the information generating unit 12 accesses the user management information holding unit 20 and searches the user management information 20D with card identification information (recorded data of the card identification area) included in the read information as a key (step S103).

From the search results, the information generating unit 12 determines whether the card identification information has already been registered as user identification information of the user management information 20D (step S104).

If the card identifying information has not been registered (step S104: NO), the information generating unit 12 generates the user management information 20D based on the read information (step S105). Then, the information generating unit 12 sets card identification information included in the read information as a value of "the user identification" item of the user management information 20D. Moreover, the information generating unit 12 sets a default value provided in advance as a value of "the management" item of the user management information 20D. In other words, the information generating unit 12 adds new data (item value groups of "user identification" and "management") corresponding to the user who placed over the user card C.

In this way, in the image processing apparatus 100, the information generating unit 12 causes the user management information 20D, including the card identification information to be generated and registered, so that the user management information 20D and read information of the user card C are dynamically collated.

On the other hand, when the card identification information has already been registered (step S104: YES), the information generating unit 12 determines (performs assumed authentication) that it is a user card C which has already been read, and performs a process of usage permission (step S106). The process of usage permission includes screen displaying which reports a log-in success to an operating panel 120 provided by the image processing apparatus 100, the screen displaying being of an equipment-installed function for which usage permission is performed.

Moreover, when a reading error is detected (step S102: YES), the reading unit 11 performs an error process (step S107). The error process includes voice notification and screen displaying which report a log-in failure to the operating panel 120 provided by the image processing apparatus 100, for example.

FIGS. 6A and 6B are diagrams indicating exemplary data transition of user management information 20D according to the present embodiment. FIGS. 6A and 6B show the exemplary data transition when the process procedure shown in FIG. 5 is executed. FIGS. 6A and 6B envisage a case such that a user card C with card identification information "C001" that has not been read yet is placed over the image processing apparatus 100.

For example, in the image processing apparatus 100, before the user card C is placed over, as shown in FIG. 6A, the respective information items of the user management information 20D are empty (value: NULL). Then, when the user card C is placed over and recorded data are read in the image processing apparatus 100, values as shown in FIG. 6B (a value "C001" of the "user identification" item, a default value of the management item, etc.). In this way, in the image processing apparatus 100, new data, which are dynamically tied to the user card C, are registered in the user management information 20D.

Summary

As described above, according to the image processing apparatus 100 according to the present embodiment, the information generating unit 12 generates and registers the user management information 20D according to a predetermined rule based on the read information when the reading unit 11 first reads the user card C. As a result, in the image processing apparatus 100, when the same user card C is read the next time, usage permission is determined based on user management information 20D that is collated to register.

In this way, in the image processing apparatus 100 according to the present embodiment, an operational burden of the administrator/user in information management may be reduced. (It is not necessary to manually collate information).

A Second Embodiment

In the first embodiment, while a description is provided of generating user management information in accordance with a predetermined generating rule, it is not limited thereto.

In the present embodiment, a technique is proposed of generating user management information in accordance with control settings for controlling information generation operations.

Below only matters which differ from the first embodiment are explained, so that repeated explanation is omitted, giving the same reference letter to the same matter.

Information Management Function

FIG. 7 is a diagram showing an exemplary functional configuration of information management according to the present embodiment.

The difference from the functional configuration shown in FIG. 2 is that the information generating unit 12 has a control unit 121. The control unit 121 is a functional unit which controls generation of the user management information 20D. The control unit 121 accesses the control information holding unit 30 and specifies (below called "data to be processed" for convenience) recorded data to be processed and a generating rule at the time of information generating based on control information and controls information generating operation in accordance with the specified information sets. For example, the control information holding unit 30 corresponds to a predetermined storage area of a storage apparatus the image processing apparatus 100 is provided with.

Now, control information according to the present embodiment is described.

FIGS. 8A and 8B are diagrams indicating exemplary data of control information 30D according to the present embodiment.

As shown in FIGS. 8A and 8B, the user management information 31D has information items such as "generation" and "control setting" collated for each information item generated. With the information, a control setting which is applied at the time of generating information of the user management information 20D is managed.

The "generation" item, which is an item in which is set information indicating information items of the user management information 20D generated based on the read information, the item value including a value (an identifier) for identifying the "user identification" item, the "management" item, etc., for example. The "control setting" item is an item in which is set information (below called "control setting information") showing a control setting for controlling the information generating operation.

Moreover in the present embodiment, the "control setting" item has information items such as "generating rule" and "target data". The "target data" item is an item in which is set information (target data specifying information) which specifies data to be processed at the time of generating information and values of the item includes an address value which indicates a destination for accessing the recorded data, etc.

Figure 9:
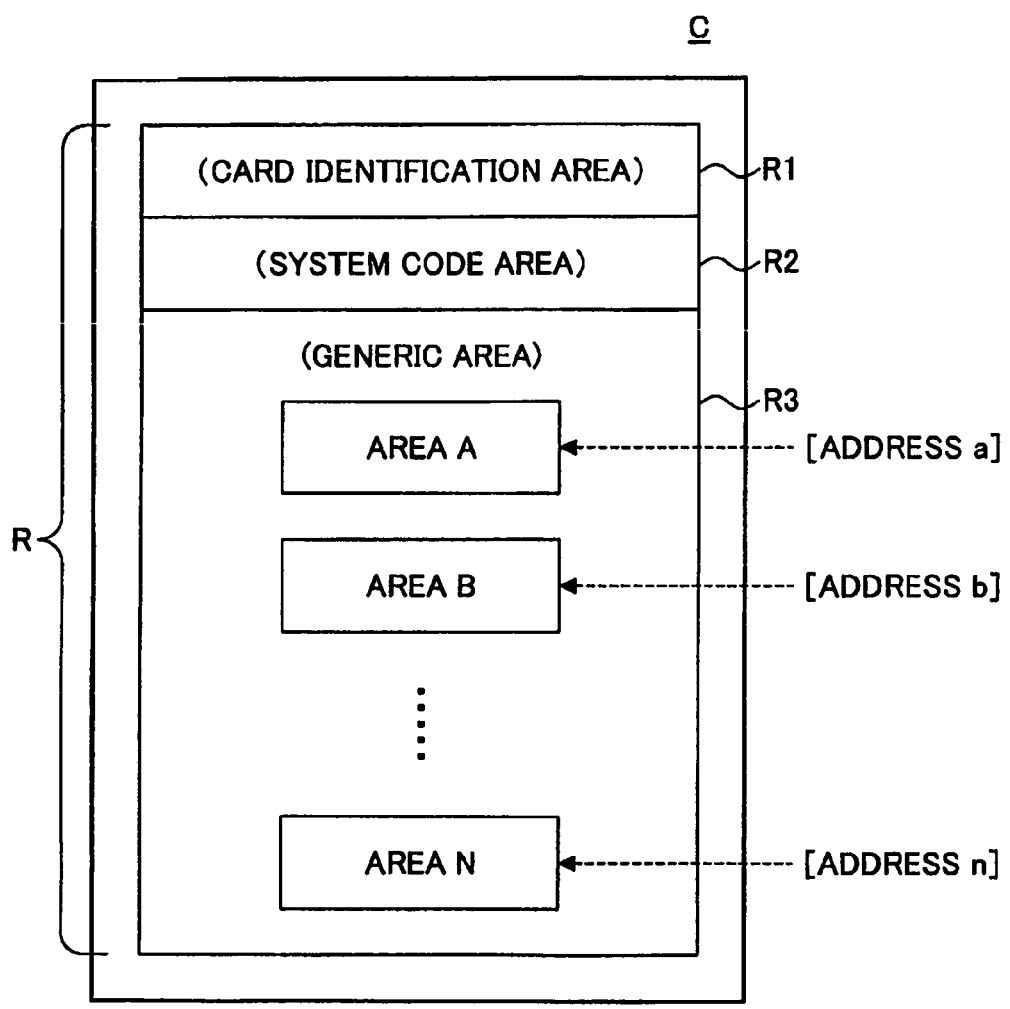
FIG. 9 is a diagram illustrating an exemplary data configuration of the user card according to the second embodiment of the present invention.

FIG. 9 is a diagram showing an exemplary data configuration of the user card C according to the present embodiment.

The present embodiment envisages generating and registering information based on read information from the user card C having the data configuration as shown in FIG. 9, for example.

As described above, in the first embodiment, data desired by the card user side can be recorded in the generic area R3.

Therefore, in an environment which manages the user, it is desirable for the administrator to be able to record information associated with the user (below called "user information" for convenience) in the generic area R3 and to generate the user management information 20D based on the user information. This is because the policies for managing the user (below called "information management policies") differ from environment to environment, so that the administrator wishes to manage the user with a management method according to policies.

The generic area R3 used in this way includes multiple areas (areas A-N). Thus, recorded data of the respective areas may be read based on address values (addresses a to n) which indicate destinations for accessing the recorded data.

Returning to the explanation of FIGS. 8A and 8B, in light of the above, in "the target data" item is set the above-described address value as an item value.

For the "generating rule" item, which is an item in which is set a generating rule at the time of generating information, the item value includes values as shown in FIGS. 8A and 8B, for example. FIG. 8A shows examples of item values such as adding location (location data) in the data to be processed and character/character string (additional data) to be added to the data to be processed at the time of generating information. On the other hand, FIG. 8B shows examples of item values such as expression (below called "information generating expression" for convenience) to have '%' character (below called "character to be replaced" for convenience) with data to be processed (below called "information generating expression" for convenience).

These respective item values may be preset by the administrator through a predetermined tool as described above. The method of setting thereof is as follows, for example. The administrator launches a setting tool pre-installed with an information processing apparatus (a PC: personal computer) connected to the image processing apparatus 100 via a data transmission path such as a LAN (local area network) and remotely sets item values of the information items on the setting screen of the tool. If the setting tool is a generic application which is Web based such as a browser, etc., the information management function according to the present embodiment may provide a Web-based control setting function (setting function via Web page).

Returning to the explanation of FIG. 7, in the present embodiment, the information generating unit 12 generates user management information 20D as follows, with control of information generating operation by the control unit 121.

For example, when the control unit 121 controls the information generating operation, based on the control information 30D shown in FIG. 8A, the process operates as follows. First, in response to read results (presence/absence of a reading error detected) of the user card C in the reading unit 11, the controller 121 accesses the control information holding unit 30. Based on control setting information and generating item information of the control information 30D, the controller 121 specifies data to be processed, generating rule at the time of generating information, generating item in the user management information 20D, etc.

More specifically, when the "user identification" item of the user management information 20D is a generated item, data to be processed (recorded data accessible with an address a) corresponding to the address a is specified from recorded data included in the read information of the user card C and a generating rule which adds a character string ("User") at the head of the data to be processed. Moreover, when the "management" item of the user management information 20D is a generating item, data to be processed corresponding to an address b is specified from recorded data included in the read information of the user card C as well as a generating rule which adds a character string ("@XXX.com") at the tail of the data to be processed.

In response to specifying of the generating rule and the data to be processed, the information generating unit 12 accesses the user management information holding unit 20. In accordance with the generation rule, based on the data to be processed, the information generating unit 12 generates user management information 20D.

More specifically, when the "user identification" item of the user management information 20D is a generating item and the specified data to be processed are "001", in accordance with the generating rule, a character string operation is conducted which couples data added to the head of the data to be processed, a concatenated character string "User001" is generated and set as a value of the "user specifying" item. Moreover, when the "management" item (an e-mail address) of the user management information 20D is a generating item and the specified data to be processed are "abc", in accordance with the generating rule, a character string operation is conducted which concatenates data added to the tail of the data to be processed, so that a concatenated character string "abc@XXX.com" is generated and set as a value of the "management" item (e-mail address).

When the control unit 121 controls the information generating operation based on the control information 30D shown in FIG. 8B, it operates as follows.

When "the user identification" item of the user management information 20D is a generated item, the control unit 121 specifies data to processed which corresponds to the address a that is included in read information of the user card C, and specifies a generating rule which replaces a character "%" of an information generating expression "User %" with the data to be processed. Moreover, when "the management" item of the user management information 20D is a generated item, data to processed is specified which corresponds to the address b that is included in read information of the user card C, and a generating rule is specified which replaces a character "%" of the information generating expression ("%@XXX.com) with the data to be processed.

When the "user identification" item of the user management information 20D is a generating item and the specified data to be processed are "001", in accordance with the generating rule, the information generating unit 12 conducts a character string operation which replaces a character to be replaced with data to be processed, a replaced character string "User001" is generated and set as a value of the "user specification" item. Moreover, when the "management" item (an e-mail address) of the user management information 20D is a generating item and the specified data to be processed are "abc", in accordance with the generating rule, a character string operation is conducted which replaces a character to be replaced with the data to be processed, so that a replaced character string "abc@XXX.com" is generated and set as a value of the "management" item (e-mail address).

In this way, in the present embodiment, based on user information recorded in the generic area R3 of the user card C, the user management information 20D is generated in accordance with control setting of control information 30D set (customized) in accordance with information management policies.

As described above, the information management function according to the present embodiment is implemented by the respective functional units operating in association.

Detailed operations of an information management function (operations of functional unit groups in association) according to the present embodiment are explained using a flowchart which indicates a processing procedure.

Process of Information Management

FIG. 10 is a flowchart illustrating exemplary processing procedures for information management according to the present embodiment. In the processing procedures in FIG. 10, a case is envisaged in which the user card C which has not been read yet is placed over the image processing apparatus 100, in which user card C "C001" is set in the area A of the generic area R3 and "abc" is set in the area B.

As shown in FIG. 10, in the image processing apparatus 100, the reading unit 11 reads recorded data from the user card C (step S201). Then, the reading unit 11 detects an error having occurred at the time of reading (a reading error).

If the reading error is not detected (step S202: NO), the reading unit 11 passes the read information (recorded data) to the information generating unit 12.

In the information generating unit 12, the control unit 121 accesses the control information holding unit 30 and refers to the control information 30D (step S203). Then, based on a value of the "control setting" item which is set in association with the "generating" item (user identification) of the control information 30D, the control unit 121 specifies data to be processed and a generating rule of user identification information.

More specifically, when an address a is set in the "data to be processed" that corresponds to the "generating" item (user identification) of the control information 30D, the control unit 121 specifies, as data to be processed, recorded data (C001) specified with an address a, the data being included in read information of the user card C. Moreover, based on a value of the "generating rule" item which corresponds to the "generating" item (user identification) of the control information 30D, the control unit 121 specifies addition data ("User") and location data (head).

In response to specification of data to be processed and the generating rule, the information generating unit 12 generates a value of the "user identification" item of the user management information 20D in accordance with the generating rule based on data to be processed (step S204). Then, the information generating unit 12 performs a character string operation which concatenates addition data at a location based on location data to data to be processed, and generates, as user identification information, a concatenated character string "UserC001".

The information generating unit 12 accesses the user management information holding unit 20 and searches the user management information 20D with the generated user identifying information (concatenated character string) as a key (step S205).

From the search results, the information generating unit 12 determines whether the generated user identification information has already been registered as user identifying information of the user management information 20D (step S206).

If the generated user identifying information has not been registered (step S206: NO), the information generating unit 12 generates the user management information 20D based on the read, information (step S207). Then, the information generating unit 12 sets user identification information generated in advance as a value of the "user identification" item of the user management information 20D.

Moreover, in the information generating unit 12, based on a value of the "control setting" item that is set in association with the "generating" item (an e-mail address) of the control information 30D, the information generating unit 12 specifies data to be processed and a generating rule of the e-mail address, and generates and sets a value of the "management" item of the user management information 20D.

More specifically, when an address b is set in the "data to be processed" that corresponds to the "generating" item (e-mail address) of the control information 30D, the control unit 121 specifies, as data to be processed, recorded data (abc) specified with an address b, the data being included in read information of the user card C. Moreover, based on a value of the "generating rule" item which corresponds to the "generating" item (e-mail address) of the control information 30D, the control unit 121 specifies additional data ("@XXX.com") and location data (tail).

The information generating unit 12 performs a character string operation which concatenates addition data at a location based on location data to the data to be processed, generates a concatenated character string "abc@XXX.com" to be an e-mail address value, and sets the generated e-mail address value to a value of the "management" item of the user management information 20D.

In other words, the information generating unit 12 adds new data (item value groups of "user identification" and "management") corresponding to the user who placed over the user card C.

In this way, in the image processing apparatus 100, the information generating unit 12 causes user management information 20D which includes information ("UserC001", "abc@XXX.com") generated from read information of the user card C to be generated and registered and the user management information 20D and the read information of the user card C to be dynamically collated.

On the other hand, when the card identification information has already been registered (step S206: YES), the information generating unit 12 determines (performs assumed authentication) that it is a user card C which has already been read, and performs a process of usage permission (step S208).

Moreover, when a reading error is detected (step S202: YES), the reading unit 11 performs an error process (step S209).

FIGS. 11A and 11B are diagrams indicating an exemplary data transition of user management information 20D according to the present embodiment. FIGS. 11A and 11B show an exemplary data transition when the processing procedure shown in FIG. 10 is executed.

For example, in the image processing apparatus 100, before the user card C is placed over, as shown in FIG. 11A, the respective information items of the user management information 20D are empty (value: NULL).

Then, when the user card C is placed over and recorded data are read in the image processing apparatus 100, values as shown in FIG. 11B are set in the respective information items of the user management information 20D with a process by the information generating unit 12 (process of step S207). More specifically, "UserC001" is set in the "user identification" item and "abc@XXX.com" is set in the "management" item (e-mail address).

In other words, generated information is set based on user information recorded in the user card C. In this way, in the image processing apparatus 100, new data, which are dynamically tied to the user card C, are registered in the user management information 20D.

Summary

As described above, according to the image processing apparatus 100 according to the present embodiment, the information generating unit 12 generates and registers the user management information 20D according to a predetermined rule based on the read information when the reading unit 11 first reads the user card C to dynamically collate the user management information 20D and the read information of the user card C.

Here, in the information generating unit 12, based on control setting information and generating item information of the control information 30D set in advance, the control unit 121 specifies data to be processed within the read information (recorded data in a generic area), a generating rule at the time of information generating, the generating item in the user management information 20D, etc. In response to the specification of the data to be processed and the generating rule, the information generating unit 12 conducts a data operation (a character string operation) on data to be processed in accordance with the generating rule, and generates an information item value of the user management information 20D.

As a result, in the image processing apparatus 100, when the same user card C is read the next time, usage permission is determined based on user management information 20D that is collated to register.

In this way, the image processing apparatus 100 according to the present embodiment effects the same advantage as the first embodiment.

Moreover, in the image processing apparatus 100, based on user information recorded in the generic area R3 of the user card C, the information generating unit 12 generates user management information 20D in accordance with control setting of control information 30D set (customized) in accordance with information management policies.

In this way, the image processing apparatus 100 according to the present embodiment makes it possible to provide an environment which allows flexible information.

A Third Embodiment

In the second embodiment, an aspect is described of generating user management information in accordance with control setting for controlling an information generating operation, but it is not limited thereto.

In the present embodiment, a technique is proposed of analyzing read information of the user card in accordance with control setting for controlling the information generating operation and generating user management information based on the analyzed results.

Below only matters which differ from the second embodiment are explained, so that repeated explanation is omitted, giving the same reference letter to the same matter.

Information Management Function

Figure 12:
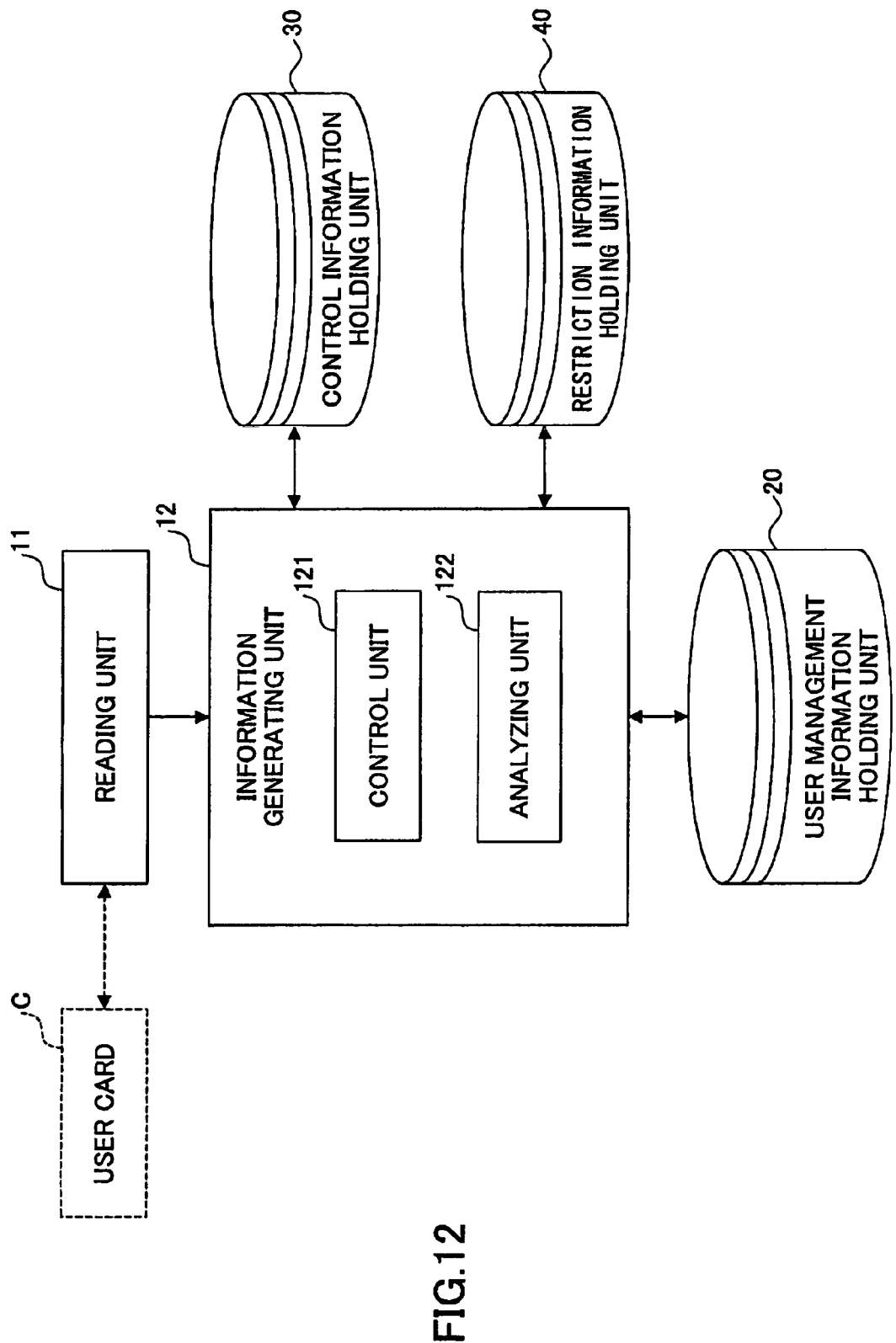
FIG. 12 is a diagram illustrating an exemplary functional configuration of information management according to a third embodiment of the present invention.

FIG. 12 is a diagram showing an exemplary functional configuration of information management according to the present embodiment.

The difference from the functional configuration shown in FIG. 7 is that the information generating unit 12 has an analyzing unit 122. The analyzing unit 122 is a functional unit which analyzes read information of the user card C.

Now, control information 30D according to the present embodiment is described.

FIG. 13 is a diagram indicating exemplary data of the control information 30D according to the present embodiment.

As shown in FIG. 13, in the present embodiment, a generating rule is set which applies read information to data to be processed, for the respective analyzed results (below called merely "analyzed results") in accordance with predetermined conditions (below called "analysis conditions" for convenience).

In the present embodiment, the generating rule is set by a regular expression. For example, when the "user identification" item of the user management information 20D is a generating item, the regular expression ("0[w*]? U %:P %") is set. Moreover, when the "management" item (e-mail address) of the user management information 20D is a generating item, the regular expression ("[¥w¥d._-]? %@XXX-.com: none") is set. A statement of the regular expression ("A? B:C"), which is common to both settings means that "a data operation B is applied when a condition A is met, while a data operation C is applied when the condition A is not met". In other words, the condition A corresponds to an analysis condition, the data operation B or C corresponds to a generated rule, so that a data operation is switched based on the analyzed results (whether the condition is met).

In this way, in the "generating rule" item of the control information shown 30D in FIG. 13, the following generating rules are set for the respective generating items.

For example, a generating rule is set such that, when "the user identification" item of the user management information 20D is a generating item, a '%' character is replaced with data to be processed for each result of analyzing data to be processed that correspond to an address a (recorded data specified with the address a from read information) and different character strings ("replaced character string with the head being 'U'" or "replaced character string with the head being 'P'").

Moreover, a generating rule is set such that, when "the management" item of the user management information 20D is a generating item, different character strings ("replaced character string with the tail being '@XXX.com'" or "none") are generated for results of analyzing data to be processed that correspond to an address b (recorded data specified with the address b from read information) "result of whether they are data including one of A-Z, a-z, 0-9, '.', '_', '-'".

The analyzing unit 122 analyzes read information in accordance with analysis conditions set in the control information 30D.

Returning to the explanation of FIG. 12, in the present embodiment, by analyzing read information by the analyzing unit 122 and controlling the information generating operation by the control unit 121, the information generating unit 12 generates the user management information 20D as follows.

For example, when the control unit 121 controls the information generating operation, based on the control information 30D shown in FIGS. 11A and 11B, the process operates as follows. First, in response to read results of the user card C in the reading unit 11, the control unit 121 accesses the control information holding unit 30. Based on control setting information and generating item information of the control information 30D, the control unit 121 specifies data to be processed, a generating rule (regular expression data) including analysis conditions at the time of generating information, and the generating item in the user management information 20D, etc.

More specifically, the generating rule is specified such that, when "the user identification" item of the user management information 20D is a generating item, data to be processed that correspond to an address a of recorded data included in read information of the user card C are specified and a '%' character of information generating expression ("U %") or information generating expression ("P %") is replaced with data to be processed for each result of analyzing the data to be processed "result of whether the head of the data is '0'" and different character strings are generated. Moreover, a generating rule is specified such that, when "management" item (e-mail address) of the user management information 20D is a generated item, data to processed is specified which corresponds to the address b of recorded data included in read information of the user card C, and a character "%" of the information generating expression ("%@XXX.com") is replaced with the data to be processed, or a character string "none" is used to generate different character strings.

Moreover, when the control unit 121 specifies the generating rule (regular expression data) and the data to be processed, the analyzing unit 122 operates as follows. The analyzing unit 122 analyzes data to be processed according to analysis conditions within the generating rule that correspond to the data to be processed.

More specifically, when the "user identification" item of the user management information 20D is a generating item, data to be processed that correspond to an address a are analyzed in accordance with analysis conditions set by a regular expression ("0[w*]"?), and analyzed results "results as to whether the head of the data is '0'" are obtained. Moreover, when the "management" item (an e-mail address) of the user management information 20D is a generating item, in accordance with analysis conditions set by the regular expression ("[¥w¥d._-]"?), data to be processed are analyzed, and analysis results "results as to whether data includes any one of A-Z, a-z, 0-9, '.', '_', '-'" are obtained.

In response to analysis results of the data to be processed and specifying of the generating rule, the information generating unit 12 accesses the user management information holding unit 20. In accordance with the generation rule corresponding to analysis results in the analyzing unit 122, the information generating unit 12 generates user management information 20D.

More specifically, when the "user identification" item of the user management information 20D is a generating item and the specified data to be processed are "001", in accordance with the generating rule which corresponds to analysis results "with the head of the data being '0'", a character string operation is conducted which replaces a '%' character of the information generating expression ("U %"), so that a replaced character string "U001" is generated and set as a value of the "user identification" item. When analysis results are obtained that "the head of data is not '0'" in the analyzing unit 122, a character string operation of replacing a '%' character of the information generating expression ("P %") and a replaced character string "P001" is generated.

Moreover, when the "management" item (an e-mail address) of the user management information 20D is a generating item and the specified data to be processed are "abs", in accordance with the generating rule which corresponds to analysis results "data including any one of A-Z, a-z, 0-9, '.', '_', '-'", a character string operation is conducted which replaces a '%' character with the data to be processed, and a replaced character string "abc@XXX.com" is generated and set as a value of the "management" item (e-mail address). When analysis results are obtained which are not "data consisting of A-Z, a-z, 0-9, '.', '_', '-'", a replacing character string "none" is generated.

Moreover, it may be arranged for the information generating unit 12 to generate user management information 20D as follows with an analysis of read information by the analyzing unit 122.

From the analysis of the read information, the information generating unit 12 determines the type (below called merely "user type") of a user who placed over the user card C (a holder of a card from which information is read) and generates user management information 20D based on information set in advance for each user type.

In the present embodiment, information (below called merely "restriction information" on access restrictions of equipment unit installed functions is an example of information set in advance for each user type.

FIG. 14 is a diagram indicating exemplary data of restriction information 40D according to the present embodiment.

As shown in FIG. 14, the restriction information 40D has information items such as "user identification" and "restriction setting" collated for each user type. With such information, setting of access restriction for the user is managed.

The "user type" item is an item in which information indicating a user type (below called "user type information") is set, so that the item value includes a value (identifier) which identifies a regular user and a non-regular user ("a guest user", for example). The "restriction setting" item is an item in which is set information (below called "restriction setting information") showing restriction setting for carrying out access restrictions.

Moreover, in the present embodiment, the "restriction setting" item has an information item for each function to be restricted. These information items are items in which are set information items (user restriction information: access restriction value), a value of which includes values indicating usage restriction of a function (values indicating usage permission and usage non-permission), for example.

These respective item values may be preset by the administrator through a predetermined tool, for example. The method of setting thereof is similar to the method of setting the control information 30D. The control information 40D thus set is held in the restriction information holding unit 40. For example, the control information holding unit 40 corresponds to a predetermined storage area of a storage apparatus the image processing apparatus 100 is provided with.

Returning to the explanation of FIG. 12, in the present embodiment, according to the type of the user who placed over the user card C, the information generating unit 12 generates user management information 20D as follows. In the present embodiment, when the analysis results of "the head of the data being '0'" in analyzing data to be processed that correspond to the address a are obtained, the analyzing unit 122 determines that the user who placed over the user card C is a regular user. On the other hand, when the analysis results of "the head of the data being '0'" in analyzing data to be processed that correspond to the address a are obtained, it is determined that the user who placed over the user card C is a non-regular user.

In response to results of determining of the user type, the information generating unit 12 accesses the restriction information holding unit 40. Based on the user type information and the restriction setting information of the restriction information 40D, the information generating unit 12 specifies control setting of respective equipment unit installed functions corresponding to the determined user type. The information generating unit 12 sets the respective access restriction values (setting values) of a specified restriction setting as a value of the "management" item (access control).

In this way, in the present embodiment, user information recorded in the generic area R3 of the user card C is analyzed according to the control setting of the control information 30D in which is set the generating rule including the analysis conditions, and the user management information 20D is generated based on the analysis results. Moreover, in the present embodiment, the user management information 20D is generated for each user type according to the restriction setting of the restriction information 40D in which is set usage restriction of an equipment unit installed function for each user type.

As described above, the information management function according to the present embodiment is implemented by the respective functional units operating in association.

Detailed operations of an information management function (operations of functional unit groups in association) according to the present embodiment are explained using a flowchart which indicates a processing procedure.

Process of Information Management

Figure 15:
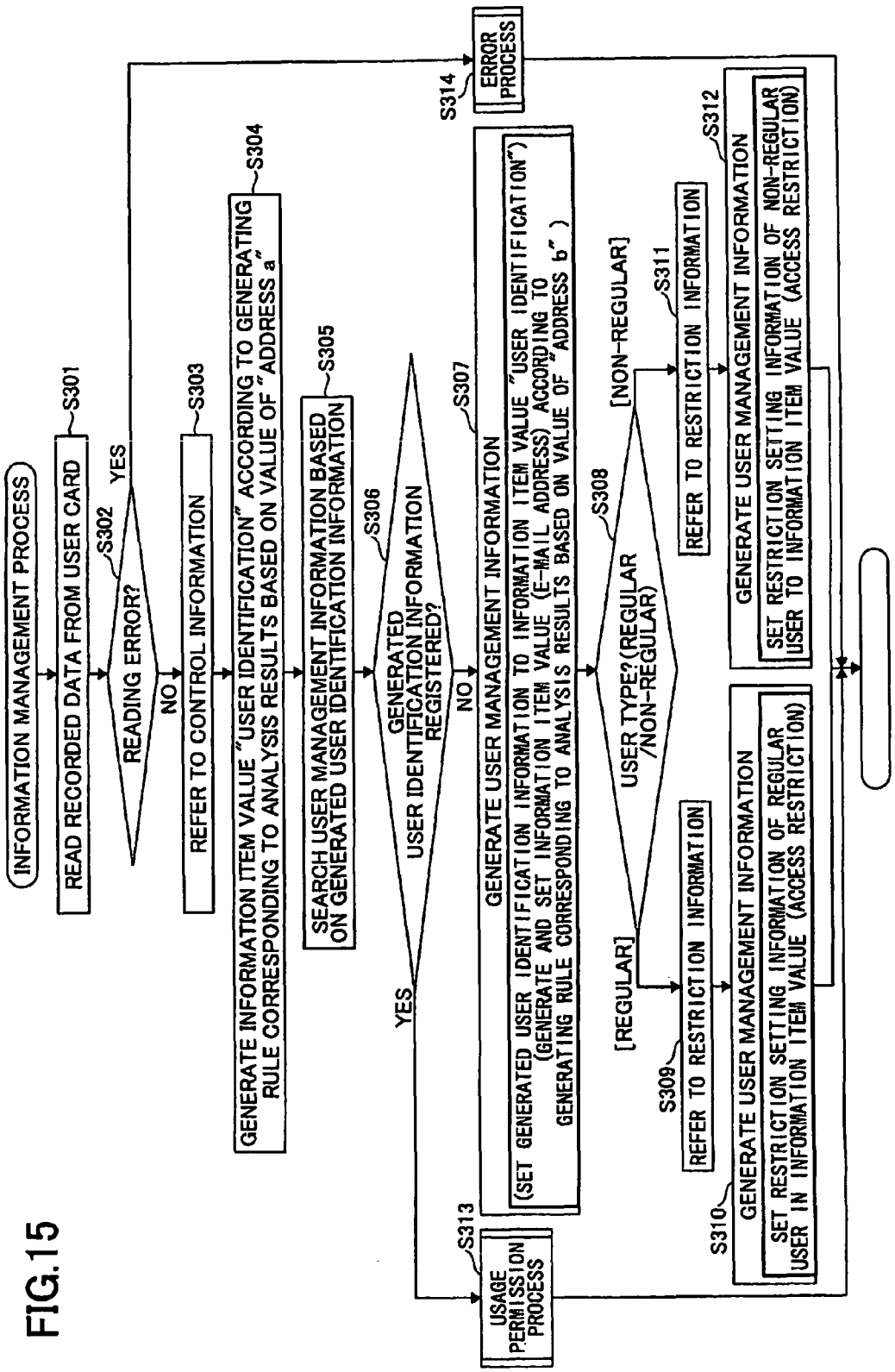
FIG. 15 is a flowchart illustrating the exemplary processing procedure of information management according to the third embodiment of the present invention.

FIG. 15 is a flowchart illustrating exemplary processing procedures for information management according to the present embodiment.

As shown in FIG. 15, in the image processing apparatus 100, the reading unit 11 reads recorded data from the user card C (step S301).

If the reading error is not detected (step S302: NO), the reading unit 11 passes read information (recorded data) to the information generating unit 12.

In the information generating unit 12, the control unit 121 accesses the control information holding unit 30 and refers to the control information 30D (step S303). Then, based on a value of the "control setting" item which is set in association with the "generating" item (user identification) of the control information 30D, the control unit 121 specifies data to be processed and a generating rule of user identification information, etc.

More specifically, when an address a is set in the "data to be processed" that corresponds to the "generating" item (user identification) of the control information 30D, the control unit 121 specifies, as data to be processed, recorded data (001) specified with an address a, the data being included in read information of the user card C. Moreover, based on a value of the "generating rule" item which corresponds to the "generating" item. (user identification) of the control information 30D, the control unit 121 specifies a generating rule (regular expression data: "0[w*]? U %:P %") including analysis conditions at the time of generating information.

Based on the data to be processed, the information generating unit 12 generates a value of a "user identification" item of the user management information 20D in accordance with a generating rule corresponding to analysis results by the analyzing unit 122 of data to be processed. Here, in accordance with the analysis condition ("0[w*]?") within the generating rule, the analyzing unit 122 analyzes data to be processed and obtains analysis results as to whether the data to be processed meets the analysis conditions "results as to whether the head of the data is '0'".

As a result, when the analysis results that the condition is met is obtained, the information generating unit 12 performs a character string operation which replaces a character to be replaced with data to be processed according to the information generating expression "U %", and generates the replaced character string ("U001") as user identification information.

The information generating unit 12 accesses the user management information holding unit 20 and searches the user management information 20D with the generated user identification information (concatenated character string) as a key (step S305).

From the search results, the information generating unit 12 determines whether the generated user identifying information has already been registered as user identification information of the user management information 20D (step S306).

If the generated user identification information has not been registered (step S306: NO), the information generating unit 12 generates the user management information 20D based on the read information (step S307). Then, the information generating unit 12 sets user identification information generated in advance as a value of the "user identification" item of the user management information 20D.

Moreover, in the information generating unit 12, based on a value of the "control setting" item that is set in association with the "generating" item (an e-mail address) of the control information 30D, the information generating unit 12 specifies data to be processed and a generating rule of the e-mail address, and generates and sets a value of the "management" item of the user management information 20D.

More specifically, when an address b is set in the "data to be processed" that corresponds to the "generating" item (e-mail address) of the control information 30D, the control unit 121 specifies, as data to be processed, recorded data (abc) specified with an address b, the data being included in read information of the user card C. Moreover, based on a value of the "generating rule" item which corresponds to the "generating" item (e-mail address) of the control information 30D, the control unit 121 specifies a generating rule (regular expression data: "[¥w¥d._-]? %@XXX.com: none" including analysis conditions at the time of generating information.

For the data to be processed, the information generating unit 12 generates a value of a "management" item (an e-mail address) of the user management information 20D in accordance with a generating rule corresponding to analysis results by the analyzing unit 122 of the data to be processed. Here, in accordance with the analysis condition ("[¥w¥d._-]?") within the generating rule, the analyzing unit 122 analyzes data to be processed and obtains analysis results as to whether the data to be processed meets the analysis conditions "results as to whether they are data including any one of A-Z, a-z, 0-9, '.', '_', '-'".

As a result, when the analysis results that the condition is met is obtained, the information generating unit 12 performs a character string operation which replaces a character to be replaced with data to be processed in accordance with an information generating expression ("%@XXX.com"), and generates the replaced character string ("abc@XXX.com") as user identification information. After generating an e-mail address value, the generated e-mail address value is set as a value of "management" item (e-mail address) of the user management information 20D.

In other words, the information generating unit 12 adds new data (item value groups of "user identification" and "management") corresponding to the user who placed over the user card C to the user management information 20D.

In this way, in the image processing apparatus 100, the information generating unit 12 causes user management information 20D which includes information ("U001", "abc@XXX.com") generated from read information of the user card C to be generated and registered, and the user management information 20D and read information of the user card C to be dynamically collated.

Next, in the information generating unit 12, the analyzing unit 122 determines a user type "regular user/non-regular user" of the user who placed over the user card C from analysis (processing results in S304) of data to be processed that corresponds to the address a (step S308). Then, when the head of data to be processed is '0', the information generating unit 12 determines the user type as "regular user".

For the user type "regular user", the information generating unit 12 accesses the control information holding unit 40 and refers to the restriction information 40D (step S309).

Based on the restriction information 40D, the information generating unit 12 generates user management information 20D (step S310). Then, the information generating unit 12 sets restriction setting information sets (usage permitted functions A, B, and C of the restriction information 40D as a value of "management" item (access control) of the user management information 20D (step S310).

On the other hand, for the user type "non-regular user", the information generating unit 12 accesses the restriction information holding unit 40 and refers to the restriction information 40D, and sets restriction setting information (usage permitted function A) of the restriction information 40D as a value of "management" item (access control) of the user management information 20D.

When the user identification information has already been registered (step S306: YES), the information generating unit 12 determines (performs assumed authentication) that it is a user card C which has already been read, and performs a process of usage permission (step S313).

Moreover, when a reading error is detected (step S302: YES), the reading unit 11 performs an error process (step S314).

FIGS. 16A, 16B, and 16C are diagrams indicating exemplary data transition of user management information 20D according to the present embodiment. FIGS. 16A, 16B, and 16C show exemplary data transition when the processing procedure shown in FIG. 15 is executed.

For example, in the image processing apparatus 100, before the user card C is placed over, as shown in FIG. 16A, the respective information items of the user management information 20D are empty (value: NULL).

Then, when the user card C is placed over and recorded data are read in the image processing apparatus 100, values as shown in FIG. 11B are set in the respective information items of the user management information 20D with a process by the information generating unit 12 (process of steps S307 and S310). More specifically, "U001" is set in the "user identification" item and "abc@XXX.com" is set in the "management" item (e-mail address), and "functions A, B, and C" (usage permission function list) are set in the "management" item (access restriction).

Moreover, when the user card C is placed over by the regular user and recorded data are read in the image processing apparatus 100, values as shown in FIG. 11B are set in the respective information items of the user management information 20D with a process by the information generating unit 12 (process of steps S307 and S312). More specifically, "P1101" is set in the "user identification" item and "none" is set in the "management" item (e-mail address), and "function A" (usage permission function list) is set to the "management" item (access restriction).

In other words, based on user information recorded in the user card C, information generated according to the generating rule switched by the analysis results is set. In this way, in the image processing apparatus 100, new data, which are dynamically tied to the user card C, are registered in the user management information 20D.

Summary

As described above, according to the image processing apparatus 100 according to the present embodiment, the information generating unit 12 generates and registers the user management information 20D according to a predetermined rule based on the read information when the reading unit 11 first reads the user card C to dynamically collate the user management information 20D and the read information of the user card C.

Here, in the information generating unit 12, based on control setting information and generating item information of the control information 30D set in advance, the control unit 121 specifies data to be processed within the read information (recorded data in a generic area), a generating rule (regular expression data) including analysis conditions at the time of information generating, the generating item in the user management information 20D, etc. In the information generating unit 12, in response to specifying of the generating rule and data to be processed, the analyzing unit 122 analyzes data to be processed in accordance with analysis conditions. In response to the analysis results, the information generating unit 12 conducts a data operation (a character string operation) on data to be processed in accordance with the generating rule which corresponds to analysis results, and generates an information item value of the user management information 20D.

As a result, in the image processing apparatus 100, when the same user card C is read the next time, usage permission is determined based on user management information 20D that is collated to register.

In this way, the image processing apparatus 100 according to the present embodiment effects the same advantage as the first embodiment. Moreover, in response to analysis results of the read information, the generating rule to be applied at the time of generating information may be switched and, even for the same generating item, user management information 20D with a different value may be generated even for the same generating item.

Moreover, in the image processing apparatus 100, based on analyzed results of the analyzing unit 122, the information generating unit 12 determines the user identification, sets a restriction setting of the restriction information 40D in which is set (customized) usage restriction of equipment unit installed functions for each user type as a value of an information item, and generates the user management information 20D.

In this way, the image processing apparatus 100 according to the present embodiment may provide an environment which makes it possible to manage information flexibly. Moreover, user management information 20D with different values may be generated even for the same generating item according to user type determined from analysis results of read information.

In the above-described embodiments explained in the foregoing, the "information management function" according to the above-described embodiments is realized by programs, which have coded the respective processing procedures explained using the Figures in a programming language suitable for an operating environment (platform), being executed by a processing device (CPU) of the image processing apparatus 100.

The above program may be stored in computer-readable recording media 104a. In this way, the program may be installed in the image processing apparatus 100 via the drive apparatus 104, for example. Moreover, the image processing apparatus 100 is provided with an apparatus 107, also making it possible to use telecommunications lines to perform downloading and installation of the program.

Furthermore, an image processing apparatus 100 having an information management function is exemplified in the embodiments, but it is not limited thereto. The information management function according to the present embodiment is applicable to an electronic equipment unit (information processing apparatus) which starts providing functional usage by an operation of reading from an electronic recording card.

Variation

In the above embodiments, an explanation is provided of a configuration in which an image processing apparatus 100 has an information management function, but it is not limited thereto. For example, as shown in FIG. 17, it may be a system 1 in which multiple equipment units work together to realize the information management function.

FIG. 17 is a diagram illustrating an exemplary system configuration of a user management system 1 according to a variation of an embodiment of the present invention.

In FIG. 17 is shown a system configuration in which multiple image processing apparatuses $100_1$-$100_n$ and the management server 200 are connected with a predetermined transmission path N such as a LAN, etc., for example.

The management server 200 is an equipment unit which has an information management function. The management server 200, which is an information processing apparatus such as a PC (personal computer), performs a process of supplying usage permission and a process of generating user management information 20D.

Figure 18:
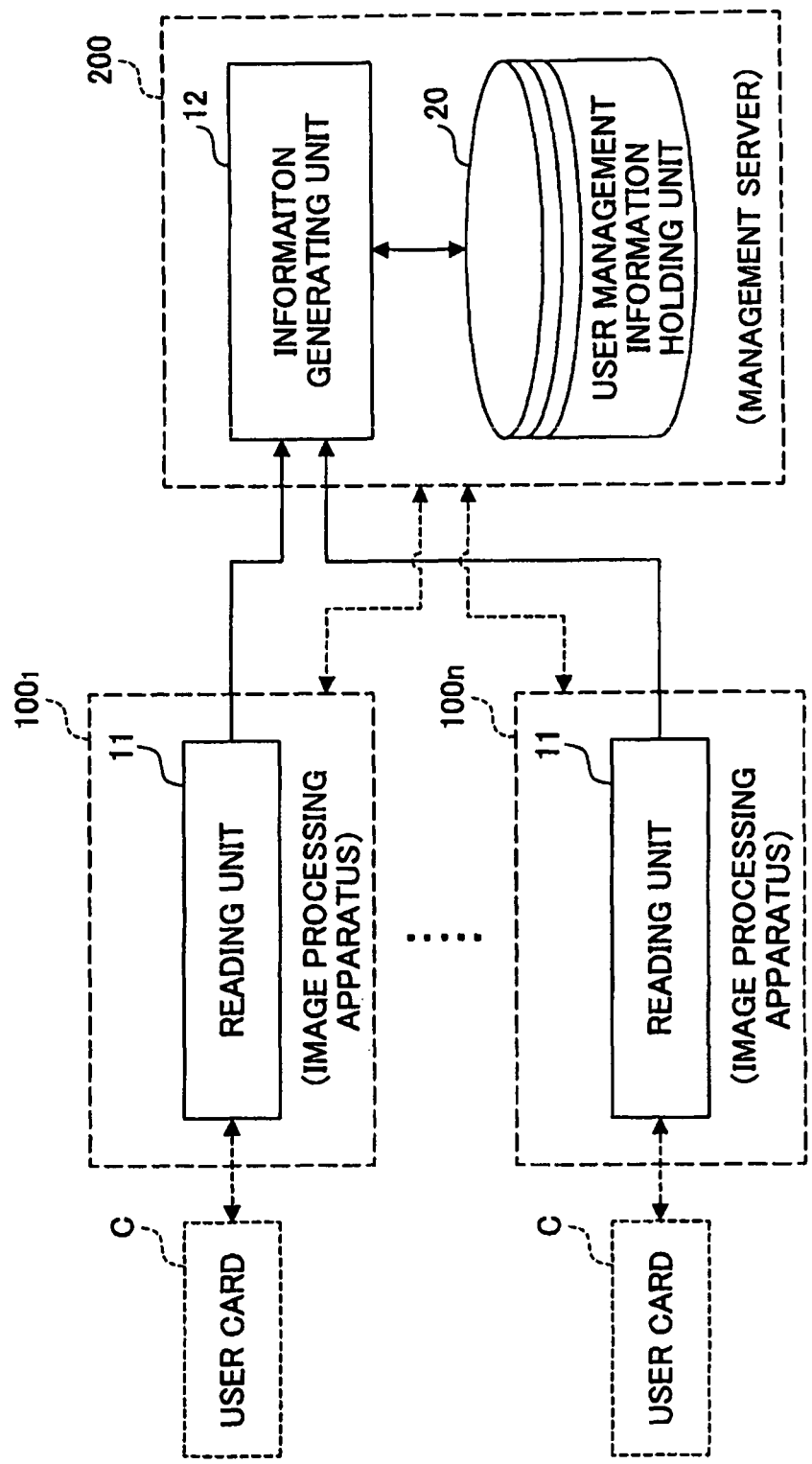
FIG. 18 is a diagram illustrating an exemplary functional configuration of information management according to a variation of the embodiments of the present invention.

Such a user management system 1 realizes an information management function with a functional configuration shown in FIG. 18, for example.

FIG. 18 is a diagram showing an exemplary functional configuration of an information management system according to the present variation.

As shown in FIG. 18, in the information management function according to the present variation, the management server 200, which has an information generating unit 12 and a user management information holding unit 20, operates in association with the reading unit 11 which the image processing apparatus 100 has.

More specifically, the image processing apparatus 100 transmits read information of the reading unit 11 to the management server 200. It is assumed that network identification information (an IP address: internet protocol address, for example) is set in advance in the image processing apparatus 100.

Based on received data (read information) from the image processing apparatus 100, the management server 200 generates user management information 20D and registers it in the user management information holding unit 20. Then, the management server 20 transmits usage permission to the image processing apparatus 100.

When information generated based on received data has already been registered in the user management information holding unit 20, the management server 200 does not generate the user management information and transmits only usage permission to the image processing apparatus 100.

In this way, the user management system 1 according to the present variation may operate in association with respective functional units included by the management server 200 and the image processing apparatus 100.

Finally, the present invention is not limited to requirements shown herein such as a shape, a configuration, a combination thereof with the other elements, etc. These matters can be changed without compromising the spirit of the present invention, so that they may be determined according to the applicable embodiments thereof.

The present application is based on Japanese Priority Application No. 2011-119341 filed on May 27, 2011, the entire contents of which are hereby incorporated by reference.

The invention claimed is:

1. An information processing apparatus, comprising:
    a connecting unit configured to connect to a reading unit which reads an electronic recording card;
    a receiving unit configured to receive read information stored in the electronic recording card via the reading unit;
    a generating unit configured to generate user management information of a user based on the read information received by the receiving unit, the user management information including at least user identification information;
    a determining unit configured to determine whether the user identification information generated by the generating unit has been registered in a storage area; and
    a holding unit configured to hold user management information generated by the generating unit in the storage area if it is determined that the generated user identification information has not been registered in the storage area.

2. The information processing apparatus as claimed in claim 1, wherein the generating unit generates the user management information in which management information which manages the user and the user identification information which identifies the user are collated for the user according to a generating rule, the generating rule being based on the read information.

3. The information processing apparatus as claimed in claim 1, wherein
    the generating unit sets card identification information included in the read information, as part of the user identification information in accordance with a generating rule, the card identification information identifying the electronic recording card, and
    generates the user management information.

4. The information processing apparatus as claimed in claim 2, further comprising:
    a control unit configured to control a generation of the user management information by the generating unit based on control information in which control setting information and generating item information are collated by the generation, the control setting information including a location for accessing the read information corresponding to data to be processed and the generating rule at the time of the generation, the generating item information indicating an information item of the user management information generated based on the read information, wherein
    the control unit specifies a generating item based on the generating item information and specifies the data to be processed and the generating rule based on the control setting information, and the generating unit conducts a data operation, according to the generating rule, on the data to be processed that correspond to the generating item specified by the control unit, sets the operated data as an item value of the generating item, and generates the user management information.

5. The information processing apparatus as claimed in claim 4, wherein, when the control unit specifies the generating rule based on adding a location and adding a character string to the data to be processed by the control unit, the generating unit conducts a character string operation which concatenates the added character string to the added location in the data to be processed, sets the concatenated character string as the item value for the generating item, and generates the user management information.

6. The information processing apparatus as claimed in claim 4, wherein, when the control unit specifies the generating rule based on information generating expression indicated with a character string including a replacing character, the generating unit performs a character string operation in which the replacing character of the information generating expression is replaced with the data to be processed, the replaced character string being set as the item value of the generating item, and generates the user management information.

7. The information processing apparatus as claimed in claim 4, further comprising:
an analyzing unit configured to analyze the data to be processed according to an analysis condition specified by the control unit as part of the generating rule corresponding to the data to be processed, wherein the generating unit
performs a data operation according to the generating rule and a result of analyzing the data,
sets the operated data as the item value of the generating item, and
generates the user management information.

8. The information processing apparatus as claimed in claim 7, wherein the generating unit determines a type of a user holding the electronic recording card, each type of user having a corresponding information item value, and
generates the user management information based on the determined type of the user.

9. An information management method in an information processing apparatus, the method comprising:
connecting to a reading unit which reads an electronic recording card;
receiving read information stored in the electronic recording card via the reading unit;
generating user management information of a user based on the received read information, the user management information including at least user identification information;
determining whether the generated user identification information has been registered in a storage area; and
holding, in the storage area, the generated user management information if the determining determines that the generated user identification information has not been registered in the storage area.

10. A non-transitory computer-readable recording medium having recorded thereon an information management program, which when executed by an information processing apparatus, causes the information processing apparatus to perform functions including:
connecting to a reading unit which reads an electronic recording card;
receiving read information stored in the electronic recording card via the reading unit;
generating user management information of a user based on the received read information, the user management information including at least user identification information;
determining whether the generated user identification information has been registered in a storage area; and
holding, in the storage area, the generated user management information if the information processing apparatus determines that the generated user identification information has not been registered in the storage area.

* * * * *